Figure 1:
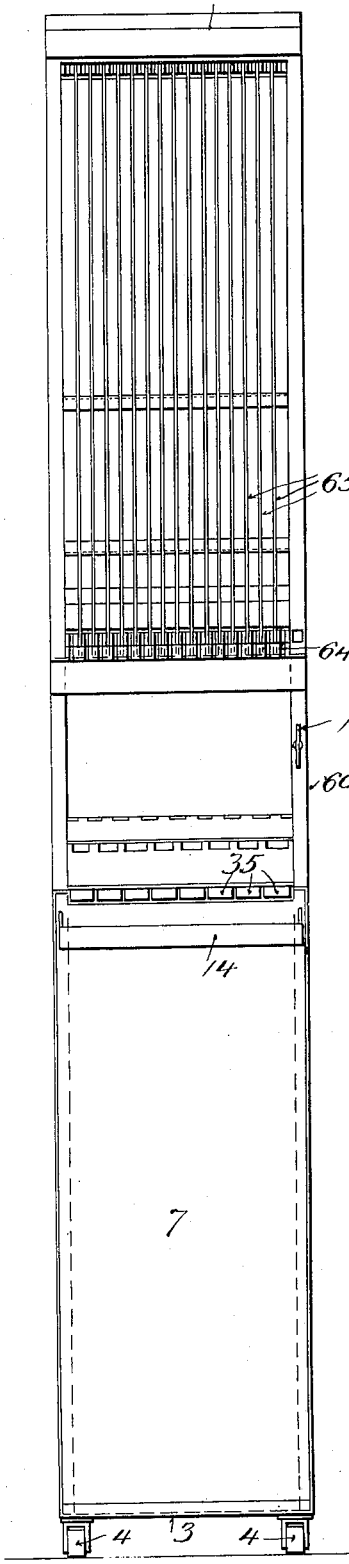

Jan. 16, 1934.  Z. AUERBACH  1,943,577

FILING CABINET

Original Filed Aug. 2, 1929    9 Sheets-Sheet 1

INVENTOR.
Zenach Auerbach
By
Charles G Hensley
ATTORNEY.

Jan. 16, 1934.  Z. AUERBACH  1,943,577
FILING CABINET
Original Filed Aug. 2, 1929  9 Sheets-Sheet 2
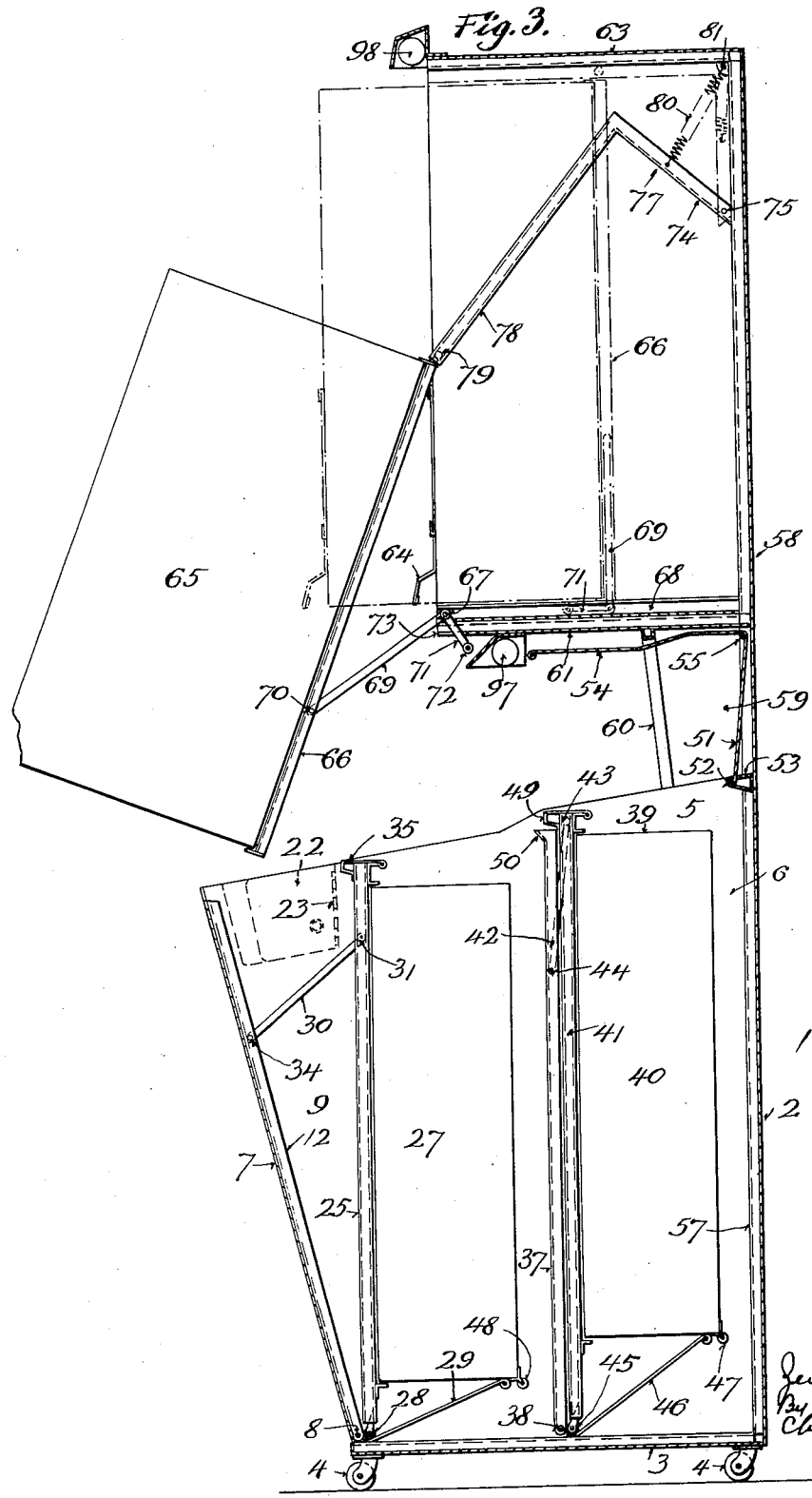

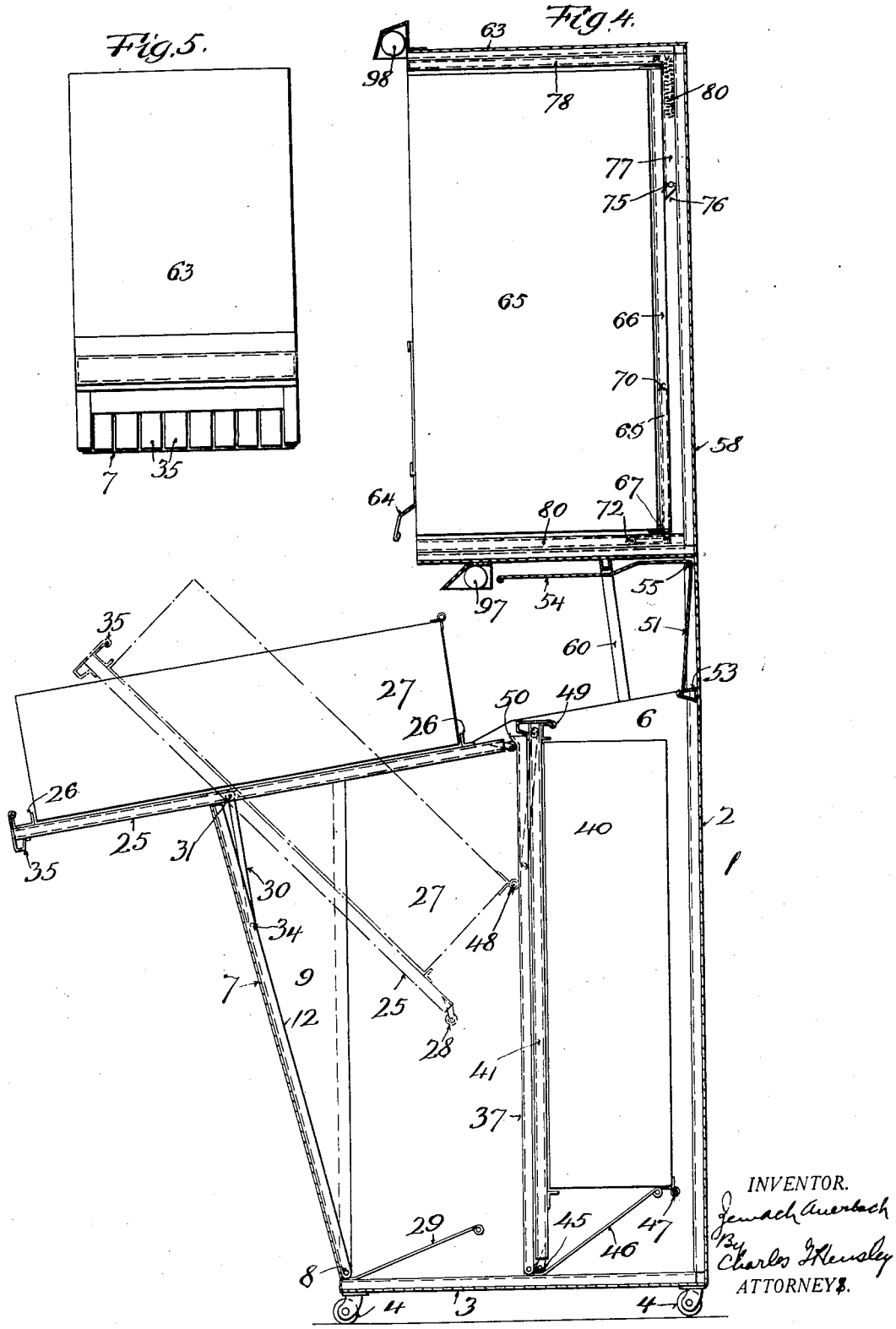

Jan. 16, 1934.          Z. AUERBACH              1,943,577
                        FILING CABINET
              Original Filed Aug. 2, 1929    9 Sheets-Sheet 4
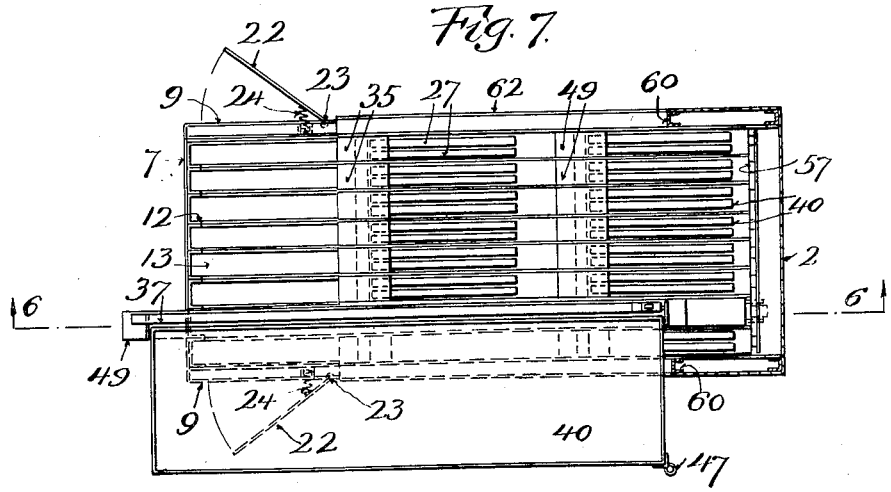
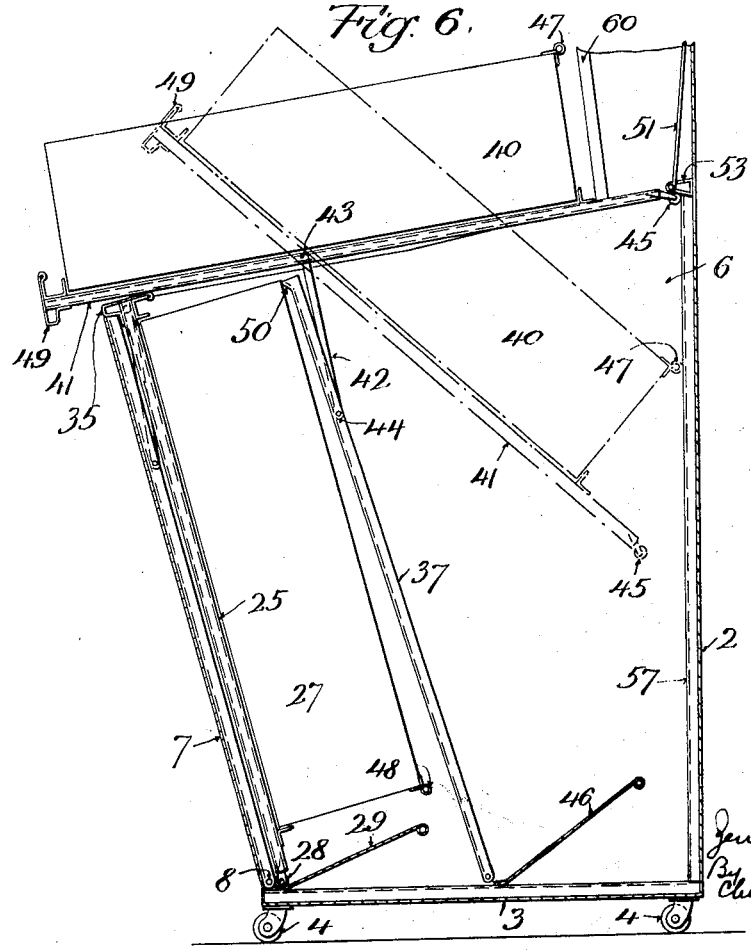
INVENTOR.
Zenach Auerbach
By Charles G. Hensley
ATTORNEYS.

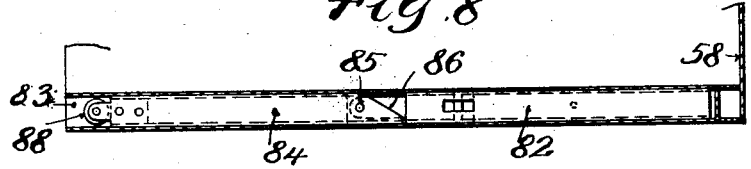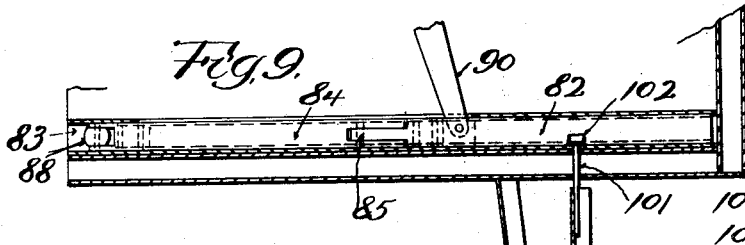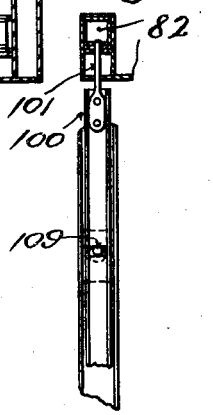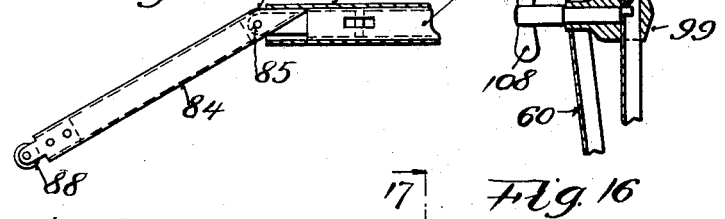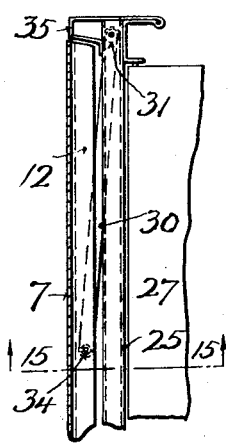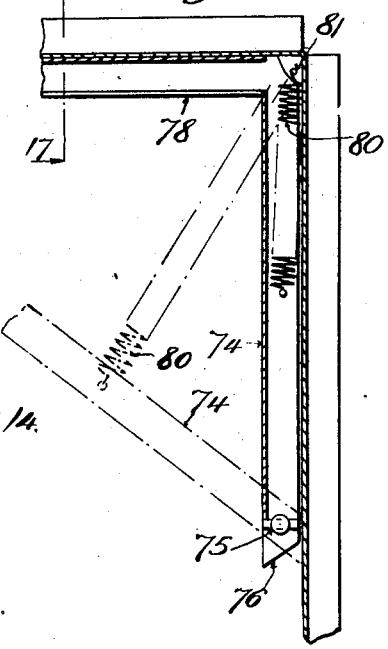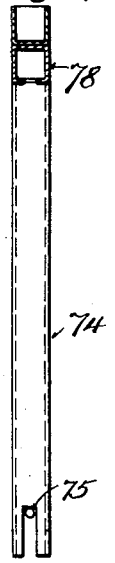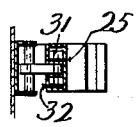

Jan. 16, 1934.   Z. AUERBACH   1,943,577
FILING CABINET
Original Filed Aug. 2, 1929   9 Sheets-Sheet 6
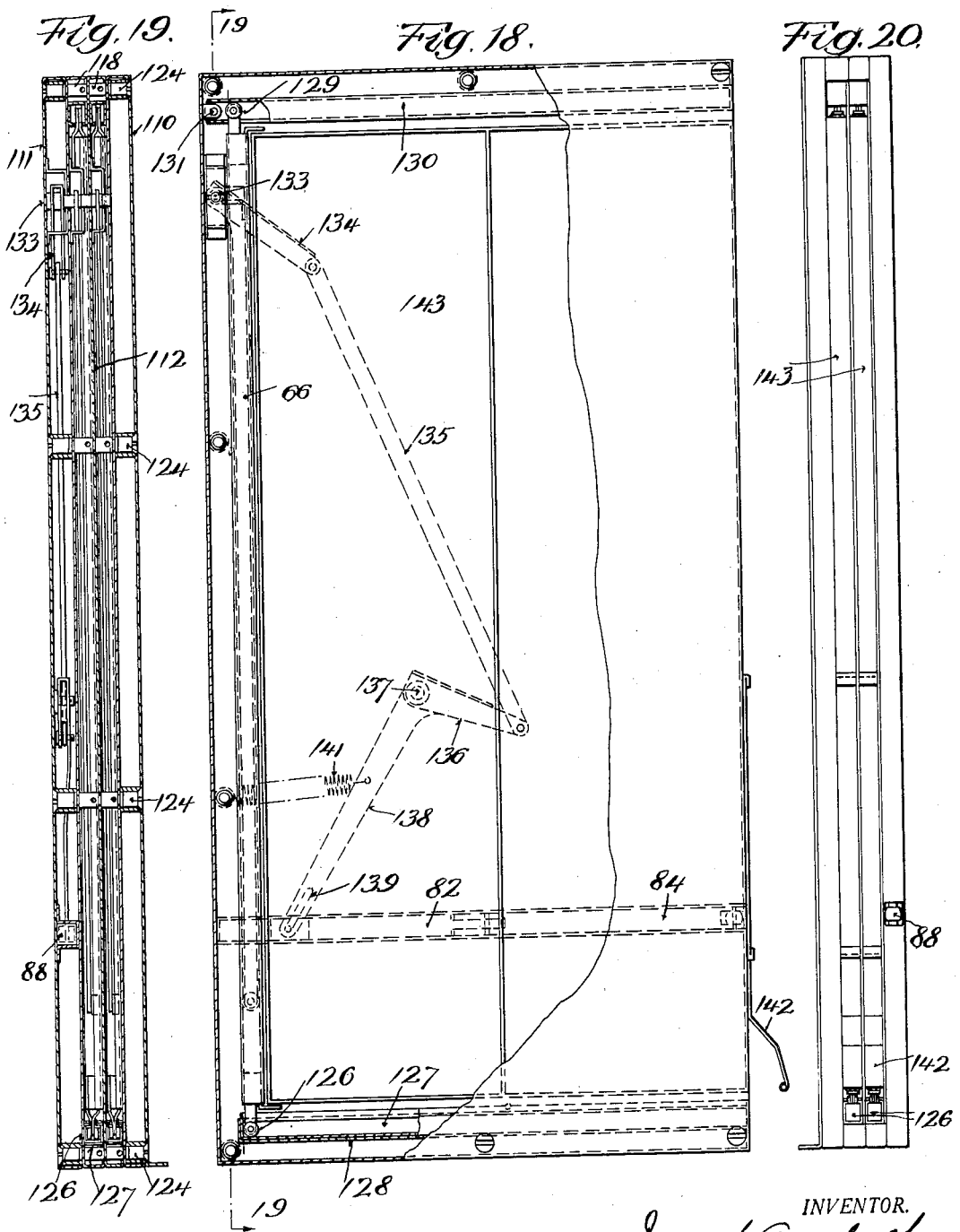

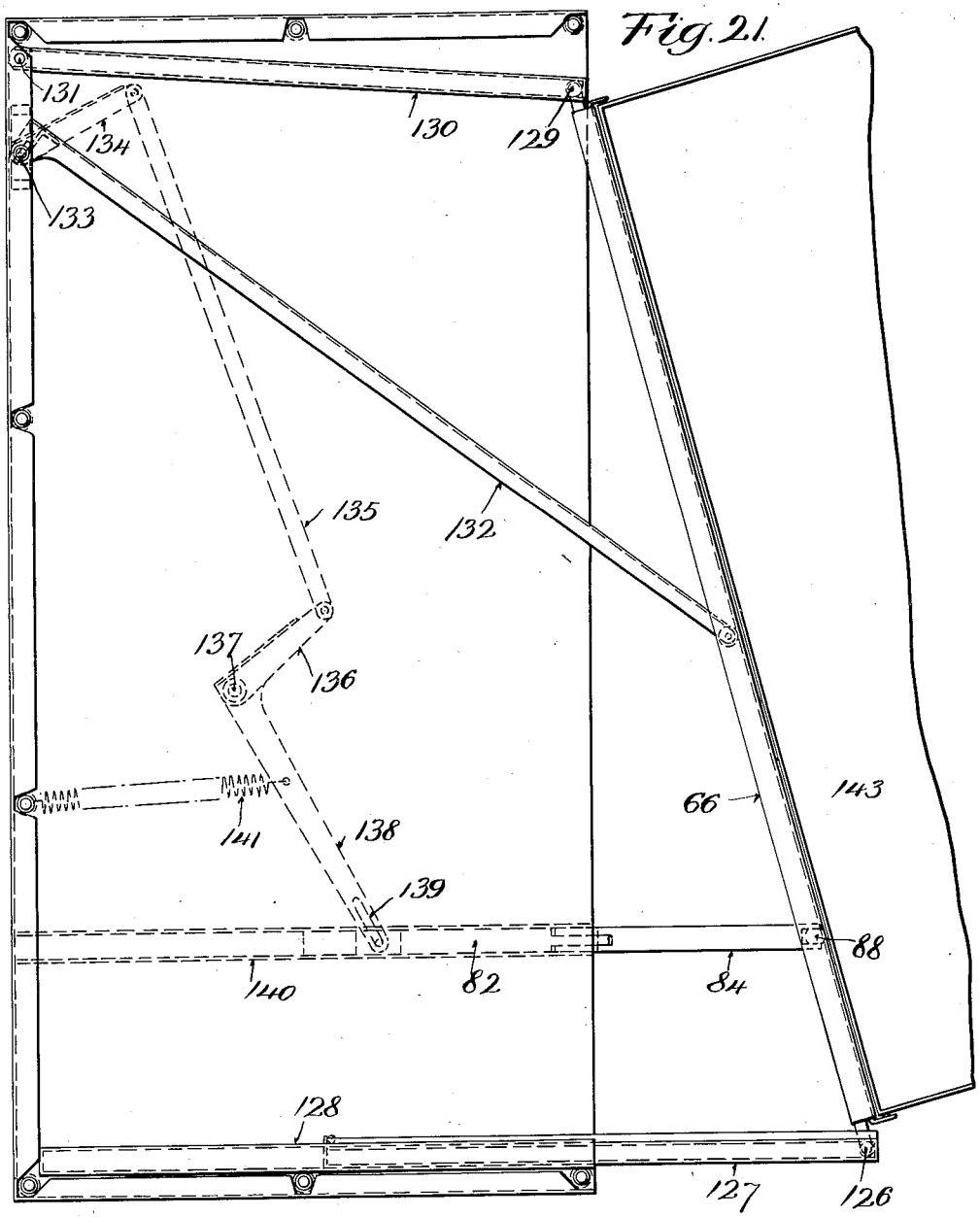

Jan. 16, 1934.    Z. AUERBACH    1,943,577
FILING CABINET
Original Filed Aug. 2, 1929    9 Sheets-Sheet 8
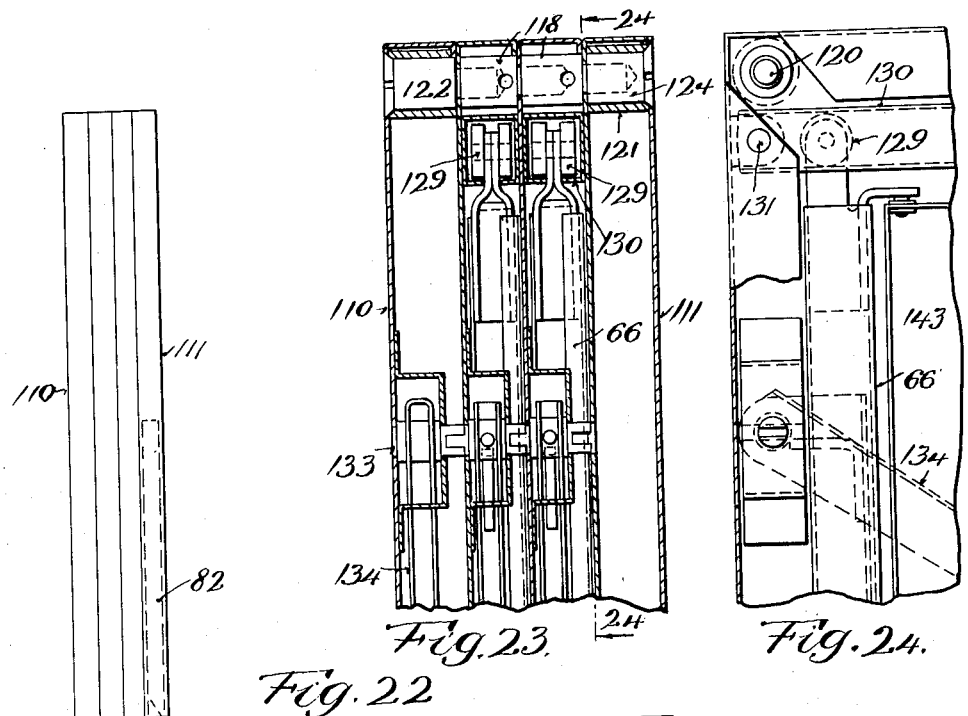
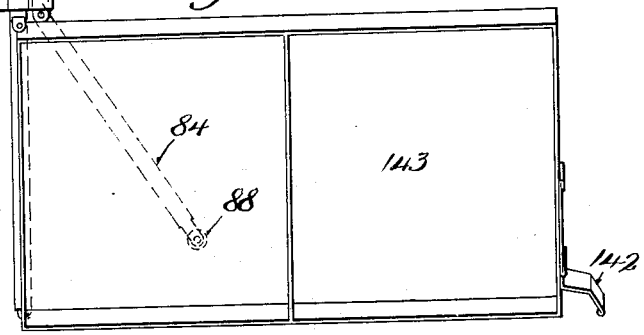
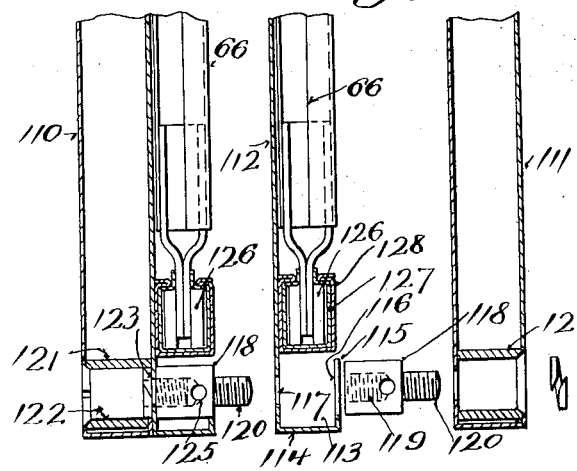
INVENTOR.

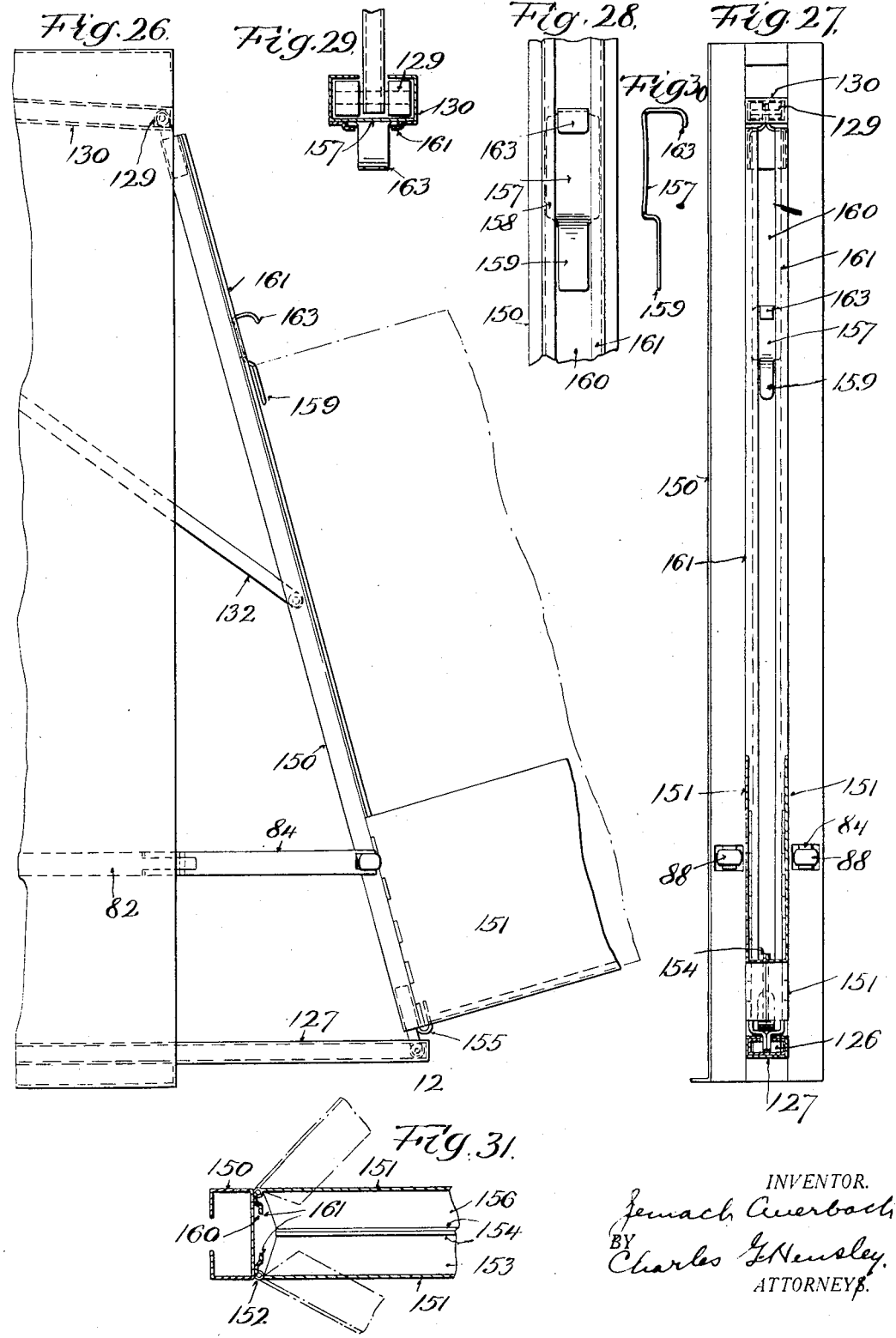

Patented Jan. 16, 1934

1,943,577

UNITED STATES PATENT OFFICE 1,943,577

FILING CABINET

Zemach Auerbach, New York, N. Y.

Application August 2, 1929, Serial No. 383,002
Renewed June 10, 1933

25 Claims. (Cl. 45—2)

The object of my invention is to provide a filing cabinet having movable holders adapted to move in relation to the cabinet in which they are contained in order to bring the contents into position for examination or writing and so combined with the cabinet that when the holders are in closed position the cabinet will take up much less space than the ordinary cabinet having longitudinally sliding drawers. The present cabinet of a given capacity will require less space in a room than the ordinary sliding drawer cabinet when in closed position and in addition, when the holders are drawn out into active position the overall depth of the cabinet and the holder is considerably less than the overall depth of the ordinary horizontally sliding drawer cabinet in open position.

In addition to providing a compact type of cabinet it is the object of my invention to provide a cabinet in which the holders may be drawn out into active position with the least effort on the part of the operator.

The present invention renders it possible to provide a multiple row of holders in a cabinet disposed in vertical planes, one row behind the other, and to permit the holders of either the front or back rows to be selectively withdrawn into active position without interfering with the holders of an adjacent row.

To this end the holders of the front and back rows are adapted to be swung individually from the vertical into a horizontal or slightly inclined position adjacent the front of the cabinet, so that the contents of the holder will be accessible. In order that the cabinet may be as compact as possible when in closed position, the front wall or door of the cabinet is adapted to pivot from its lower end so that the upper end may swing forwardly to provide the necessary space for the swinging of the holders to bring them into active position.

Another object of the invention is to provide a vertical filing cabinet having movable holders and made up in unit construction so that sections may be added from time to time to increase the size and capacity of the cabinet. In other words, it embodies an expansible cabinet construction with movable holders. Another object of the invention is to provide an elevated cabinet which may be positioned in an elevated or even overhead location with the holders movable forwardly and downwardly to give access to their contents. In the full embodiment of my invention the lower cabinet sections may be combined with the upper or elevated sections, so that with a given allowance of floor space cabinets may be arranged having many times the capacity of a set of ordinary drawer cabinets arranged in an equal space. A further advantage of the combination is that the records are concentrated in a smaller space and therefore an operator, in manipulating a large number of records, is not obliged to travel as far in going from cabinet to cabinet for a given number of records as with the old style of cabinets. In both the lower and the elevated cabinets the holders may be quickly drawn into active position and be quickly returned into folded position, so that they may be manipulated very rapidly.

The holders are adapted to hold loose leaves, cards or bound books, so that they are adapted for any form of record. The upper cabinet sections may be arranged to hold a relatively limited number of records and then as expansion of the records may require it, the upper cabinet may be expanded by the addition of intermediate sections, to increase the capacity. The holders of both the upper and lower compartments may be quickly moved into the most convenient positions for operation for the operator to have access to the contents thereof and with a minimum of manual effort so that the tendency of the operator to become fatigued by repeated operations of the holders is reduced to a minimum, thereby increasing the working capacity of the operator. By increasing materially the capacity of the system so that the greatest number of records may be condensed into a given space the operator may manipulate the greatest number of records with a minimum of movement between the several holders.

Another object of my invention is to provide a common locking device for locking both the upper and lower sets of cabinets with a single locking key.

Another object is to provide improved devices for controlling the movements of the holders between the active and folded positions. Other advantages and improvements will be set forth in the following detailed description of my invention.

Figure 2:
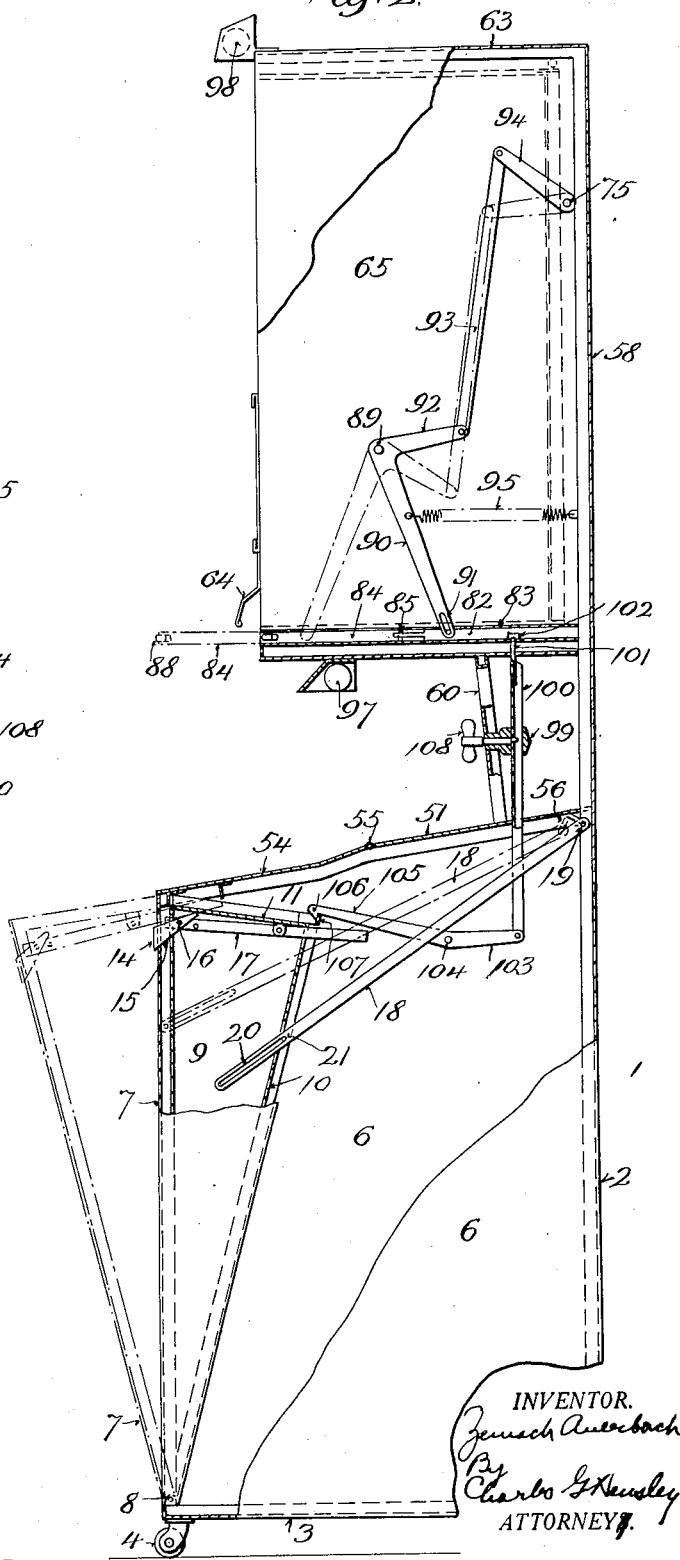

In the drawings forming part of this application,

Figure 1 is a front elevation of a combined upper and lower cabinet embodying my invention and showing the parts in closed position, Figure 2 is an end elevation thereof with portions of the side plates removed and illustrating the locking arrangement and the rest for the holders, Figure 3 is a vertical, sectional view of the cabinet, including upper and lower sections and showing the front portion of the lower cabinet in open position and a holder of the upper cabinet withdrawn into operative position, Figure 4 is a vertical sectional view of the cabinet showing one of the holders of the lower cabinet arranged in operative position and with the holders of the upper section in closed position, Figure 5 is a plan view of the cabinet in closed position, Figure 6 is a vertical sectional view taken on the line 6—6 of Figure 7 and showing the lower cabinet section with one of the holders of the rear or innermost row drawn into active position, Figure 7 is a horizontal sectional view and it shows in plan the parts which are illustrated in Figure 6, Figure 8 is a detail sectional view showing the rest for the holders in closed or inoperative position, Figure 9 is a sectional view showing the holder rest corresponding to Figure 8 in side elevation, Figure 10 is a sectional view showing the holder rest moved into operative position, Figure 11 is a detail view of the locking device for the holder rest, Figure 12 is a sectional view showing in elevation the upper part of one of the holders of the lower cabinet together with its carrier and its supporting arm, Figure 13 is a front view of the holder carrier, Figure 14 is a front elevation of the supporting arm for one of the holders, Figure 15 is a sectional view taken on the line 15—15 of Figure 12, Figure 16 is a detail sectional view showing the supporting arm for one of the holders of the upper cabinet, Figure 17 is a sectional view taken on the line 17—17 of Figure 16, Figure 18 is a side elevation with parts broken away and illustrating a modified construction of the upper cabinet, Figure 19 is a sectional view taken on the line 19—19 of Figure 18, Figure 20 is a front view of the same parts shown in Figure 18, Figure 21 is a side view of a modified construction of upper cabinet showing one of the holders drawn forward into operative position, Figure 22 is a plan view of a cabinet with a tray drawn forward into operative position, Figure 23 is a section of the upper part of the cabinet shown in Figure 19 but on a larger scale, Figure 24 is a side view of the parts of the cabinet which are shown in Figure 23, Figure 25 is a sectional view of the lower part of the cabinet partly disassembled, Figure 26 is a side elevation of the cabinet as used for holding books instead of cards, the holder being shown drawn forward into operative position, Figure 27 is a front view of the same, Figure 28 is an enlarged front view of a portion of the section shown in Figure 27 to illustrate the adjustable book holder, Figure 29 is a sectional view illustrating the adjustable book holder, Figure 30 is a side elevation of the adjustable book holder, and Figure 31 is a sectional view of the book holder.

I will first describe the form of the invention shown in Figures 1 to 17 inclusive. It will be pointed out that in the embodiment of my invention shown herein there is a lower cabinet and an upper cabinet disposed over the lower cabinet, but it will be apparent that the lower and upper cabinets may be used separately wherever desired. I prefer to construct the cabinets from metal as far as possible and to provide double walls in parts of the cabinet, but I do not wish to be understood as limiting my invention to these particular embodiments. In the drawings I have shown a lower cabinet 1 which may be placed against a wall or lined up back to back against a similar cabinet. It comprises a rear wall 2 and a bottom 3 to which casters 4 may be attached to render the cabinet movable over the floor.

There are end walls 5 at opposite ends of the cabinet connected with the back wall and bottom to form a compartment 6 for receiving and housing the several holders. The front door of the cabinet, which is shown as composed partly of plates 7 is hinged at the bottom from the hinge 8, so that the upper portion of this wall or door may swing outwardly as shown in dotted lines in Figure 2 to provide a top opening through which the holders may be withdrawn into operative position. This front wall or door has end plates 9 at each end, of triangular shape, to correspond with the spacing of the front wall of the door from the front of the cabinet when the door is in open position. These triangular end walls move in the spaces between the double plates of the end walls of the cabinet. At the rear edge of each of these triangular end walls there is a reinforcing bar or rib 10 to stiffen the same, and the upper end of this bar or rib 10 is connected by a similar bar 11 with the front wall of the door.

The front door is provided with a plurality of channel members 12 of U shape in cross section, as shown more clearly in Figure 7, these channel members being fixed to the door with their webs against the inner face of the front wall of the door and with their flanges extending rearwardly to form channels 13 in which the holders, to be hereinafter described, are adapted to be retained in separate vertical planes. There is a bar 14 extending across the front of the top of the door and it has rearwardly extending arms 15 pivoted on the pins 16 on the bars 17 to form a swinging handle by means of which the door may be grasped to move it either to the open or closed position. At each end of the door there is a link 18 which is pivoted near the back of the cabinet on the pin 19 and this link extends forwardly and downwardly, its front end having a slot 20 in which the pintle 21 on the rear frame of the door engages.

When the door is in closed position, as shown in full lines in Figure 2, the link 18 extends downwardly in the full line position in this view but as the door is swung forwardly on its hinge the pintle 21 moves in the slot 20 of the link 18, the link pivoting from its pin 19 until the parts reach the dotted line position in Figure 2, whereupon the link prevents further movement of the door, or, in other words, the link acts as a front stop when the door reaches its forward or extended position. The link 18 is duplicated at opposite ends of the cabinet.

There are side flaps or supports attached to the outer side of the end walls of the door and these are shown as plates 22 pivoted to these end plates of the door on the hinges 23 and they are urged to swing open to the position shown in Figure 7 by means of the coiled springs 24 which press outwardly on these plates. These plates are adapted to be automatically swung back close against the end walls of the door by the action of the end walls of the cabinet when the door is swung into closed position. They are swung open automatically by their springs 24 into the position shown in Figure 7 as the door is swung open. They are adapted to form side extensions at each side of the door when in open position to provide extended supports for the leaves of the holders as will be hereinafter described.

There are movable members adapted to lie in parallel, vertical planes within the cabinet and to be drawn out or extended into active position. These members are termed generally by the name holders and it is to be understood that the term is used broadly to cover movable members whether in the form of trays, holding plates or book holders.

In Figures 1 to 17 these members are composed of longitudinal bars 25 having brackets 26 on which are pivotally mounted the pair of leaves 27 which may open and close like leaves of a book; and for details of the construction of the holders reference may be made to my co-pending application Serial No. 325,533. The leaves are adapted to fold into relatively close parallel relation when the holders are in closed position within the cabinet and to be swung apart either separately or simultaneously like the leaves of a book to render accessible sheets or other printed or written material held between the leaves and containing records or other matter. There are two rows of these holders shown in the drawings, both arranged in vertical planes and lying one behind the other within the cabinet when in folded position, as shown in Figure 3. The bars 25 of these holders are provided with bottom rollers 28 which are adapted to rest upon and to slide in relation to the angular supporting arms 29 which are fastened near the bottom wall of the cabinet and which extend diagonally upwardly and backwardly therefrom, the rear, free ends of these arms forming supports for the bottom edges of the leaves 27. Near the upper portions of the bars 25 there are pivotally connected the links 30 one for each holder, the link having a pin on one end provided with rollers 31 which engage under the flanges 32 of the bars 25, the link 30 traveling in the slot 33 between the flanges. The opposite ends of these links are provided with pintles 34 which are mounted in fixed positions in apertures in the flanges of the U shape rails 12 lying in the inner side of the door. Each of the holders is shown provided with a bent metal plate forming a handle 35 attached to the upper portion of the bar 25 of each holder to form a handle or grip by means of which the holder may be manipulated.

The links 30 and the parts associated with them are common to all of the holders forming the front row of the lower cabinet. At one corner of each leaf of the holders there is a guide roller 36.

I have shown a series of posts 37 pivoted upon the pins 38 adjacent the bottom of the cabinet, these posts extending vertically and lying in a row behind the front row of holders, but they are movable on their pivots from the full line position shown in Figure 3 to the dotted line position shown in Figure 6. These posts are of similar construction to the members 12 which are attached to the door and there is one such post for each holder of the rear row. The holders 39 of the rear row are constructed the same as the holders of the front row, except that the leaves 40 are shown mounted on the bars 41 slightly further from the bottom ends of these bars, as shown in Figure 3, so that the leaves of the rearmost holders stand slightly higher than the leaves of the front row of holders when they are all in their folded positions. There is a link 42 for each rear holder and it has rollers 43 on one end which travel in the longitudinal channels of the posts 37 similar to the rollers 31 in the front holders. These links 42 also have pivot pins 44 pivoted in fixed positions between the flanges of the posts 37. The bottom end of the bar 41 of the holder is provided with rollers 45 which rest upon and roll against the guide arms 46 which are attached near the bottom of the cabinet and project diagonally upwardly and rearwardly. The leaves 40 of the rear holders are also provided with the guide rollers 47 corresponding to the similar rollers 48 on the front holders. The rear holders are also provided with the handles 49 at the upper end of each bar 41 by means of which the holders may be grasped and manipulated.

It will be observed that there is a forwardly turned lip 50 on the upper end of each post 37 and extending forwardly to act as a stop for the guide rollers 48 of the forward holders when the latter are moved into the active position, as shown in Figure 4, full lines.

There is a top cover for the lower cabinet section and it is here shown as foldable and adapted to be automatically moved into closed and open position upon the movement of the front door. This top 51 is pivoted near the rear of the cabinet on the hinge 52 which is mounted in a bracket 53. The top cover consists of the two plates 51, 54 hinged to each other near the central portion by the hinge 55 whereby the top cover may be folded into the angular position shown in Figure 3 or be opened to lie nearly flat as shown in Figure 2, when the cabinet is closed. Preferably, the top cover is curved in the manner shown to correspond with the curved top edges of the end plates of the cabinet. This cover is engaged by an angular crank 56 which is part of the member 19 on which the rails 18 are mounted.

I will first describe the operation of the devices associated with the lower cabinet section before passing to a description of the upper cabinet and its holders. Assuming that the cabinet and holders are in the position shown in full lines in Figures 1 and 2, the front door will be in closed position as well as the cover 51, and there will be two rows of holders lying one behind the other, all of the holders lying in parallel, vertical planes, and if the holders are of the type shown in these views, the several leaves 27, 40 of the several holders will be in closed or parallel relation so that the several holders lie in compact form within the cabinet.

The cabinet and its holders in this position will be capable of holding a much larger number or supply of records than an ordinary sliding drawer cabinet. All of the records of both rows of holders are readily accessible and any holder from the front row may be drawn into operative position without disturbing the remaining holders of the front row nor the holders of the back row; and, similarly, any holder of the back row may be drawn into operative position without disturbing other holders of the rear row or holders of the front row. Let it be assumed that the operator desires to obtain access to the records first in one of the front holders of the cabinet: The first operation will be to grasp the handle 14 and swing the front door forwardly on its hinge 8, into the dotted line position shown in Figure 2, in order to extend the upper dimensions of the cabinet sufficiently to allow the holders to be moved into operative position. As the door moves forwardly the wings or side supports 22 move to the front of the cabinet and as they do so they are swung outwardly by their springs 24 to the extended position of Figure 7, as they move out of the end walls of the cabinet. At the same time that the upper end of the door moves forwardly the pintle 21 carried by it causes the link 18 to swing into the dotted line position in Figure 2 and the swinging of this link causes the crank 56 to press upwardly on the under side of the cover member 51 so that the cover is lifted automatically by the crank into the raised position shown in Figure 4, leaving the top of the cabinet open to expose the several rows of holders. The final, forward position of the swinging door will be determined by the point at which the pin 21 reaches the end of the slot 20 of the link 18.

While the front door is being swung outwardly in the manner described, the holders remain in their vertical positions and the several links 30 swing in relation to the bars 25 of the front holders, as shown in Figure 3. The cabinet being now opened at the top and the front door being swung forwardly to extend the front to back spacing, any of the holders may be individually moved into operative position. Let it be assumed that one of the holders of the front row is to be moved up to give access to the contents, the following operation will take place: The operator will grasp the handle 35 on the upper end of the particular holder which is to be removed and will pull upwardly and forwardly. At first the guide roller 28 of the holder will be guided along one of the supporting arms 29 until the guide rollers 48 on the corners of the leaves commence to roll against one of the posts 37 in line with it. As the holder moves upwardly it is guided to swing from a vertical position towards the horizontal by the link 30 until the holder is approximately in the dotted line position of Figure 4. The operator will continue to pull forwardly on the handle until the holder arrives at the full line position of this figure at which time the guide roller 28 will engage the protecting lip 50 of the post 37 which will act as a stop to retain the holder in the position indicated in Figure 4. The leaves 27 of the holder may now be turned down or opened to give access to records or other material within the holder, the leaves serving as a support for the records to permit the operator to write upon them. During the movement of the holder into the operative position, the link 30 will swing into the vertical position and the rollers 31 will guide the holder by engagement with the flanges 32.

If the holder which is moved into the active position is near the right or left hand of the row, one of its leaves, when turned down, may rest on one of the side supports 22 as shown in Figure 7, in order to permit the operator to write against the leaf of the holder. As these lateral supports 22 swing automatically into the active position when the front door is drawn forwardly, they are always in position to support such leaves of the holders as may extend at either side of the cabinet as in Figure 7. After the operator has finished using the holder the latter may be returned to the cabinet by pushing up on the handle 35 and backwardly and the holder will be guided back into its original vertical position by the several rollers 48 and 28 and by the guiding action of the link 30. The operator may proceed to withdraw any of the other holders in the front row in the same manner. If it is desired to reach the records in one of the rear holders, the operator will grasp the handle 49 of any one of the rear holders, it being understood that the holders in the front row are in their lower position within the cabinet. As one of the rear holders is drawn upwardly and forwardly, the swinging post 37 with which the particular holder is connected will be swung forwardly on its pivot 38 as shown in Figure 6. When the holder first moves upwardly its lower roller 45 will be guided on the angular arm 46 and then the roller 47 on the corner of the leaves will be guided in one of the tracks 57 at the back wall of the cabinet, as shown in dotted lines in Figure 6. At the same time the forward portion of the holder will be guided by the rollers 43 and the link 42, which latter moves with the post 37 as it is tilted forwardly by the movement of the holder to the full line position of Figure 6.

The rear holder will be raised into the forward and inclined position shown in full lines in Figure 6, where it will be held by the link 42 and by the engagement of the roller 47 with the bracket 53; and in this operative position the leaves of the holder may be turned back or opened to permit access to the records or other material in the holder. When the operation on this holder has been completed, the leaves will be folded up into parallel relation and the holder will be returned into the cabinet by moving the handle 49 backwardly. The several guiding members which guide the holder during its rising movement will co-operate to guide it back again into the position shown in Figure 3. The front holder in line with the rear holder just described was swung forwardly against the door by the post 37 pressing against it as shown in Figure 6, to permit the rear holder to be moved up and this front holder may remain in the forward position until the door is closed or it may be swung back by hand into the vertical position. When it is desired to close the lower cabinet the front door is swung backwardly on its pivot 8 and this will rock the link 18, turn the crank 56 and the hinged cover will move down into the closed position shown in Figure 2. It will be apparent from the above that any of the holders of the front or rear row may be quickly moved into operative position individually of the other holders and it may be quickly returned within the cabinet to allow any other holder to be moved into operative position.

I will now describe the construction of the upper or elevated cabinet which is placed in an elevated position, preferably above and in line with the lower cabinet in order to make full use of the space. The upper cabinet is preferably of double wall construction and it is supported from the rear wall 58 which is a continuation of the rear wall of the lower cabinet, and by the end walls 59 and their reinforcing frame 60 which extend upwardly from the end walls of the lower cabinet.

However, it will be understood that the upper cabinet may be supported independently of the lower cabinet, or it may be used without the presence of the lower cabinet, although there are obvious advantages in having the upper and lower cabinets constructed to be moved or placed as a complete unit. I have shown the upper cabinet as composed of the rear wall above referred to, of the bottom wall 61 formed of spaced plates, the double end walls 62 and the top wall 63. In the upper cabinet it is preferable to employ a single row of holders and to move these downwardly and forwardly into operative position. The holders may be constructed similarly to the lower holders except for slight changes. Referring to Figures 1 to 17 inclusive it will be noted that I have arranged the handles 64 for manipulating the individual holders on the leaves 65 adjacent the corner which is lowermost when the holders are folded within the cabinet. The holders have bars 66 on which the leaves are hinged like the previously described holders. There are angle levers provided at the intersection of their arms with the roller 67 and this roller travels in a track 68 just above the bottom wall of the cabinet and in a horizontal direction. One arm 69 of this angle lever is pivoted at the point 70 to the bar 66 of a holder. The other arm 71 of the lever is provided with a roller 72 which at one time will move horizontally in the track 68 and at another time will swing through a slot 73 in the forward edge of the bottom wall of the cabinet and act as a stop to limit the downward swing of the arm 69. This angle lever forms the lower supporting member of the holder and there is one such lever for each holder.

Near the upper portion of the cabinet there is an angular arm 74 pivoted on the pin 75 adjacent the back wall of the cabinet and the end of this arm on one side of the pivot is chamfered, as shown at 76 to abut against the back wall of the cabinet and limit the swing of the arm in one direction. This arm comprises the member 77 which is adapted when in folded position to lie close against the back wall of the cabinet, and the member 78 which is adapted to lie close against the top wall of the cabinet. The latter member is of channel construction to form a guiding track for the rollers 79 which are fixed on one end of the bar 66 of the holder. There is a coiled spring 80 connected with the member 77 at one end and with the fixed member 81 in the cabinet at its other end, and this spring acts as a partial counterbalance tending to lift the arm 77, 78 and the holder for facilitating returning the holder within the cabinet. This arm and its spring are duplicated for each holder in the upper cabinet.

I have provided means against which the leaves of the holder may rest in open position to facilitate writing against the leaves and it consists of the following: At each side of the cabinet and near the bottom there is a sliding bar 82 guided in a track 83 to move horizontally. This bar always remains in the track while the forward portion of the bar consists of a section 84 which is pivoted at 85 to the rear member of the bar, so that it may swing laterally to the position shown in Figure 10, in which position the chamfered end 86 of the forward section of the bar rests against the wall 87 to stop this member in the angular position shown in this view. The outer end of the member 84 is shown provided with a roller 88 with which the leaves of a holder may engage.

There is one of these bars arranged at each side of the cabinet to move in its individual track and the entire bar will lie within this track when the several holders are all in their folded position, but when any holder is moved to operative position the bar 82 will be slid forwardly in its track until the member 84 swings outwardly into the position shown in Figure 10. The member 84 will be swung back automatically into line with and slide into the track 83 by the cooperation of the end 86 with the wall 87 whenever the bar as a whole is moved rearwardly.

I have shown means for automatically projecting and retracting these bars whenever a holder is drawn forwardly from the upper cabinet. Between the parallel plates of the end walls of the cabinet at each end there is pivoted on the pin 89 an angle lever one arm 90 of which extends downwardly and its lower end is connected by a pin and slot connection 91 with the rear portion 82 of the sliding bar. The other arm 92 of this angle lever is pivotally connected to a link 93 the upper end of which is pivoted to an arm 94 which is fixed on the shaft 75 on which the several arms 74 are mounted. The coiled spring 95 is connected at one end with the arm 90 and with a bracket at the back of the cabinet and it tends to draw the angle lever in the direction necessary to retract the bar 82.

The operation of this branch of my invention is as follows: The operator may grasp the handle 64 of any holder of the upper cabinet and draw this forwardly and downwardly. The holder will first move horizontally forwardly at which time the rollers 79 will travel in the channel of the arm 78 and the rollers 67, 72 of the angle lever 71, 69 will also move horizontally in their tracks 68 until such time as the roller 72 moves out of the track, whereupon the angle lever 69, 71 may swing downwardly.

Due to the weight of the holder, not only will this lever swing downwardly into the position shown in full lines in Figure 3, but the arm 71 will stop against the bottom wall of the cabinet and form a rest to hold the holder in the angular position shown in Figure 3, which is its active position. The leaves of the holder may then be opened out to make the contents accessible. When the holder was being moved forwardly and downwardly in the above operation, the swinging movement of the angular arm 74 rocked the shaft 75 and this caused the arm 94 to rock from the full to the dotted line position in Figure 2, and this movement operated through the links 93 and the angle levers 92, 90 and the lower arm 90 moved forwardly and thus slid the bar 82, 84 in its track to the forward position. When the articulated members 84 of these bars reached the forward end of their tracks the hinges 85 permitted the arms 84 to be swung laterally to the position shown in Figure 10 by any of the leaves of the holders pressing against them as they are opened. As above set forth, this construction is duplicated at opposite sides of the cabinet but the arms 84 are constructed to move in relatively opposite directions. If the leaves of a holder at either side of the cabinet are turned downwardly to open position, one of the leaves will press on an arm 84 and swing it laterally until its edge 86 rests against the plate 87 whereupon this arm will form a rest for the leaf of the holder in a similar manner to the action of the leaves 22 in the lower cabinet. When the operator is through with the holder referred to, the latter is pushed upwardly and backwardly. It will move with the lever arm 69 and with the angular arm 78 in a diagonal direction, until it is in horizontal alignment with a compartment of the upper cabinet and it will then slide rearwardly within the cabinet.

During the upward movement of the holder the angular arm 74 will swing upwardly under the action of its retracting spring 80 until the portion 77 lies against the rear wall of the cabinet and the member 78 lies against the under side of the top of the cabinet. The upward movement of the holder will also cause the lever arm 71 to swing on its roller 67 until the roller 72 comes into alignment with the track 68. From that time on the rollers 79 travel horizontally in the horizontal portion 78 of the angular arm 74 while the holder is moving horizontally toward the back of the cabinet and at the same time the rollers 67, 72 travel in the track 68 toward the rear of the cabinet. In like manner any of the other holders of the upper cabinet may be withdrawn and returned to their respective positions within the cabinet. When the holder is moved back into the cabinet, the arm 94 and the bell crank lever 92, 90 are moved in the opposite direction to that above described, and the arm 90 retracts the rods 82 and during this movement the articulated members 84 are acted upon by the wall 87 of the track to straighten them into line with the members 82 so that they slide back automatically within the cabinet.

I have shown an electric light 97 placed under the upper cabinet, with a suitable reflector, to provide a source of lighting for the holders of the lower cabinet; and I have provided another lamp 98 at the top of the upper cabinet for lighting the holders thereof. I have provided a device for locking simultaneously the holders of both the upper and lower cabinets. As will be seen in Figures 2 and 9, there is a post 99 having a socket in which the rod 100 is movable vertically.

There is a pin 101 on the upper end of this rod, which projects through apertures in the double walled bottom of the upper cabinet and this pin is adapted to project into a recess 102 in the under side of the bar 82 when the latter is in its inner position. When this pin projects into this recess, the rod 82 cannot be moved forwardly and as this rod is connected through the bell crank lever 92, 90, the link 93 and the lever arm 94 with the several angular levers 74 which are connected with the holders in the upper cabinet, the latter cannot be moved out of the cabinet. The rod 100 extends downwardly at one side of the cover 51 into the upper portion of the lower cabinet where it is pivotally connected to an arm 103 of a lever which is pivoted on the pin 104, the latter being fixed in one of the end walls of the lower cabinet. Another arm 105 of this lever is provided with a trigger or hook 106 which is adapted to engage the front side of a member 107 which is part of the hinged front door of the lower cabinet. There is a key 108 which is insertable into an aperture in the post 99 and it is provided with an eccentric pin 109 which engages an aperture in the vertically sliding rod 100. When this key is inserted into the post so that the eccentric pin 109 engages in the aperture of the rod 100 the key may be turned, provided both upper and lower cabinets are closed. The eccentric pin on the key will raise the rod 100 to project its pin 101 into the recesses 102 of the several bars 82, thereby locking all of these. At the same time the upward movement of the rod 100 swings the lever 103, 105 so that the hook or trigger 106 engages on the front of the member 107, thereby locking the swinging front door of the lower cabinet. After this, the key may be removed, leaving both upper and lower cabinets in locked condition.

In Figures 18 to 24 I have shown the invention embodied in a cabinet which is built up in sections to permit the cabinet to be increased or decreased in capacity as occasion may require, or as the space available will permit, and in the same views I have shown a modified form of device for guiding the holders. In this construction there is a unit for each end wall here indicated by the numerals 110, 111 respectively, each of these units having spaced parallel panels, preferably made of metal and adapted to form the right and left hand end sections of the complete cabinet. In addition to the end sections there are provided any desired number of intermediate sections 112, each comprising a vertical wall or panel for dividing the cabinet off into separate compartments for the respective holders. These vertical walls are bent at their lower ends at right angles to provide a box 113 at the lower end composed partly of the panel and of the bottom member 114, and an upturned end 115 parallel with the panel. The same construction is carried not only along the bottom edge of each panel 112, but also along the rear edge and the top edge, the same reference numerals being applied to these several parts. In other words, the channel 113 is shown extending around three sides of the dividing wall. In the wall 115 of the channel there are formed slots 116 extending inwardly from the free edge and these are disposed at various positions around the three sides of the panel. Opposite each of these slots there is an aperture 117 to receive therein the shank of a screw. The blocks 118 are insertable into the slots 116 and they have a threaded bore 119 in line with the apertures 117, while on their opposite ends these blocks have threaded shanks 120 which project through the slots 116 to engage in the threaded aperture 119 of a corresponding block in an adjacent section.

The end section 110 has pockets 121 to receive the smooth body or shank of a screw 122 and these screws have threaded shanks which project through apertures 123 to engage in the threaded apertures 119 of some of the blocks 118. This construction is duplicated around the three sides of one of the end sections, as shown at the left in Figure 25. The right hand cabinet section in this figure is provided with a similar pocket 121 to receive a nut 124 which is insertable into this pocket to be screwed onto the shank 120 projecting laterally from an intermediate cabinet section lying adjacent to the section 111. It will be apparent from the above that a cabinet of any desired lateral dimension may be assembled by taking two of the end sections and any number of intermediate sections and joining them together by first placing the intermediate section against one of the end sections, inserting the blocks 118 in the channels 116 and then placing the screws 122 through the end section and screwing them into the threaded apertures 119 of the blocks 118. This will leave the threaded shanks 120 projecting laterally from the intermediate section which has been added to the end section. Any number of additional intermediate sections may be placed against the first one and assembled by inserting the blocks 118 in the channels 113 and screwing these blocks onto the projecting shanks 120. For manipulating the blocks there are lateral apertures 125 into which a tool may be inserted to turn the blocks. When the last intermediate section has been added, the remaining end section 111 is placed over the laterally projecting shanks 120 and the nuts 124 are inserted into the sockets 121 and screwed onto the respective shanks 120. This will complete the assembly of the cabinet.

From time to time additional intermediate sections may be added to or removed from the cabinet by disassembling one of the end sections and removing or adding intermediate sections and then replacing the end section.

In the same construction the holders are operated somewhat differently to the holders in the first described form of the invention. The holders themselves are very similar to those previously described. On their lower ends they are provided with rollers 126 which travel in channel rails 127 and the latter are slidably mounted in the channel shaped guides 128 which are fixed in the cabinet near the bottom, there being one for each holder. The upper end of each holder is provided with rollers 129 which travel in the channels of the upper rails 130, the latter being pivotally mounted at the rear of the cabinet on the pins 131. There is an arm 132 for each holder mounted on the shaft 133 extending horizontally at the back of the cabinet and at each end of this shaft there is fixed an arm 134 disposed between the panels of each end section. The forward ends of these arms are pivotally connected to a link 135 and the lower ends of the links are connected to the arm 136 of a bell crank lever which is pivotally mounted on the supporting pin 137. The other or lower arm 138 of this bell crank lever is connected by the pin and slot connection 139 to the sliding bar 82 which corresponds with and performs the same function as the sliding bars 82 of the previously described form. These bars slide in the tracks 140 and the forward pivotal members 84 are adapted to swing laterally a limited extent to form abutments for the leaves of the holders adjacent opposite ends of the cabinet. The spring 141 tends to retract the bars 82 by acting on the bell crank lever 138.

The operation of the parts of this form of the invention is as follows: When the holders are in their retracted position, as shown in Figures 18 to 20 the bars 82, 84 are retracted within the cabinet and the channel rails 127 are likewise within the cabinet; and the upper rails 130 are swung up against the top wall of the cabinet. If it is desired to withdraw a holder to operative position its handle 142 is grasped and drawn forwardly. The lower rollers 126 will first travel along the channel of the supporting rail 127 until it reaches the forward end, after which it will carry the supporting rail forwardly within its guiding track 128 to the full line position shown in Figure 21 to form an extended support beyond the front of the cabinet for the lower end of the holder. While the holder is moving forwardly, the upper rollers 129 are traveling in the channel of the upper rail 130 until these rollers reach the forward end of the rail and are stopped by it. The rail 130 swings downwardly at its forward end by moving on the pivot 131 so that when the holder is in its projected position as shown in Figure 21 it will lie in an inclined position convenient for the opening of the leaves 143 and for operations to be carried on in connection with the contents of the holder.

In Figures 26 to 31 I have shown the holders designed to have ordinary bound books attached to them. This permits record and account books to be mounted in the holders where it is not desired to use special record sheets. In this form the holder comprises the channel bar 150 forming the longitudinal member of each holder. A pair of plates 151 is hinged at 152 to the bar 150 to swing like the leaves in the previous forms and these have inturned bottom flanges 153 turned toward each other and the edges 154 are turned upwardly.

An ordinary bound book may be placed with its back against the bar 150 so that the bottom edges of the book covers rest on the flanges 153, lying between the plates 151 and the edges 154. A clip 155 is adapted to project into the bottom of the book 156 between the center leaves to prevent the bottom of the book moving forwardly out of the holder. There is a slider 157 having a base 158 traveling in the channel 160 of the bar 150 formed by strips 161. There is a tongue 159 projecting forwardly through the front slot of the channel 160 and this tongue is adapted to project into the upper end of the book between the center leaves, like the member 155 at the bottom and hold the upper end of the book on the holder. There is a finger grip 163 to be grasped when sliding the member 157 to project the tongue 159 into the book, wherever the top of the book may come on the bar. The book may be opened and closed with the plates 151 and otherwise the holder will be used the same as shown in the previous forms. This form of holder is thus adapted to receive and hold ordinary bound books.

Having described my invention, what I claim is:

1. In a device of the class described, a cabinet having a compartment to contain holders, a door pivoted adjacent the lower portion of said cabinet to permit the upper end of the door to be swung forwardly from the cabinet, a plurality of holders adapted to lie in vertical planes in said compartment and to be raised relatively to said door into substantially horizontal position at the top of said door and means for guiding said holders when moving between their vertical and horizontal positions, said means including pivoted members and means forming a sliding connection between the pivotal members and said holders.

2. In a device of the class described, a cabinet having a compartment to contain holders, a door forming a front closure, the width of the cabinet, and pivoted adjacent the lower portion of said cabinet to permit the upper end of the door to be swung forwardly from the cabinet, and a plurality of holders adapted to lie in vertical planes in said compartment and to be raised and swung in relation to said door into substantially horizontal position at the top of said door, said door when in forward position permitting said holders to swing from the vertical into the horizontal position and means associated with the cabinet and connected with said holders to guide the latter when moving between the vertical and horizontal positions.

3. In a device of the class described, a cabinet having a compartment to contain holders, a door pivoted adjacent the lower portion of said cabinet to permit the upper portion of the door to be swung forwardly from the cabinet, end plates on said door to maintain the ends of said compartment closed between the door and walls of the cabinet when the door is in open position, and a plurality of holders adapted to lie in vertical planes in said compartment and to be raised in relation to said door into substantially horizontal position at the top of said door, and means associated with the cabinet and connected with the holders to guide the latter when moving between the vertical and horizontal positions.

4. In a device of the class described, a cabinet having a compartment to contain holders, said cabinet including end walls each formed of spaced, parallel panels, a front door for said compartment hinged to the lower portion of the cabinet whereby the upper part of the door may be swung forwardly to increase the depth of said compartment, said door having end plates adapted to swing between the panels of the end walls of said cabinet to maintain the ends of said compartment closed when the door is swung forwardly, a plurality of holders, and means for guiding them from vertical planes in said compartment, into substantially horizontal position at the top of said door.

5. In a device of the class described, a cabinet having a compartment to contain holders, a door pivoted adjacent the lower portion of said cabinet to permit the upper end of the door to be swung forwardly from the cabinet, a plurality of holders and means for guiding them from vertical planes in said compartment into substantially horizontal position at the top of said door, and means on the inner side of said door serving as spacers to maintain said holders in spaced relation.

6. In a device of the class described, a cabinet having a compartment to contain holders, a door pivoted adjacent the lower portion of said cabinet to permit the upper end of said door to be swung forwardly, a plurality of holders, means for guiding them from vertical planes in said compartment and into substantially horizontal position at the top of said door, and handles on said holders adapted to extend above the upper edge of said door when said holders are in lowered position.

7. In a device of the class described, a cabinet having a compartment to contain holders, a door pivoted adjacent the lower portion of said cabinet to permit the upper end of the door to be swung forwardly, a plurality of holders adapted to lie in vertical planes in said compartment and to be swung into substantially horizontal position at the top of said door, and pivotal members connected with said holders and with said door, for guiding said holders in their swinging movements.

8. In a device of the class described, a cabinet having a compartment to contain holders, a door pivoted adjacent the lower portion of said cabinet to permit the upper end of the door to be swung forwardly, a plurality of holders adapted to lie in vertical planes in said compartment and to be swung into substantially horizontal position at the top of said door, members pivoted to said door and having a movable connection with said holders, said members being adapted to rock in relation to said door and to guide said holders in their swinging relation to said cabinet.

9. In a device of the class described, a cabinet having a compartment to contain holders, a door pivoted adjacent the lower portion of said cabinet to permit the upper end of the door to be swung forwardly in relation to the cabinet, a plurality of holders adapted to lie in vertical planes in said compartment and to be moved into operative position at the top of said door, said holders having channels, swinging members pivoted to said door and having rollers engaging the channels of said holders whereby said swinging members will guide said holders during their movement from the closed to operative position, and whereby the holders may slide in relation to said rollers.

10. In a device of the class described a cabinet having a compartment to contain holders, a door pivoted adjacent the lower portion of said cabinet to permit the upper end of the door to be swung forwardly, a plurality of holders adapted to lie in vertical planes within said compartment and to be moved into operative position across the top of said door, means on said door for retaining said holders in spaced relation, links pivoted to said door and having a movable connection with said holders, said links being adapted to guide the holders when moved between the closed and operative positions.

11. In a device of the class described, a cabinet having a compartment to contain holders, a door pivoted adjacent the lower portion of said cabinet to permit the upper end of the door to be swung forwardly in relation to the cabinet, a plurality of holders adapted to lie in vertical planes in said compartment and to be moved into operative position at the top of said door, and lateral supporting members attached to said door and adapted to form extended supports for said holders and adapted to be extended automatically upon the opening of said door.

12. In a device of the class described, a cabinet having a compartment to contain holders, a door pivoted adjacent the lower portion of said cabinet to permit the upper end thereof to be swung forwardly in relation to the cabinet, said door having end walls to retain said compartment closed at the sides of the door when the latter is in open position, holders adapted to lie in vertical planes in said compartment and to be moved into operative position at the top of said door, and supports attached to the end walls of said door and adapted to be projected laterally beyond the door to form extended supports for said holders.

13. A device of the class described, comprising a cabinet having a compartment to contain holders, a door pivoted adjacent the lower portion of said cabinet to permit the upper end of the door to be swung forwardly in relation to the cabinet, said door having end walls to close the ends of the cabinet when said door is in open position, and movable into said cabinet, holders adapted to lie in vertical planes in said compartment and to be moved into operative position at the top of said door, and lateral supports hinged to the end walls of said door and adapted to be automatically projected therefrom to form extended supports for said holders.

14. In a device of the class described, a cabinet having a compartment to contain holders, a door pivoted adjacent the lower portion of said cabinet to permit the upper end of the door to be swung forwardly therefrom, an obliquely disposed guiding member adjacent the bottom of said compartment, holders adapted to lie in vertical planes in said compartment and having a sliding engagement with said guiding member and pivoted members co-operating with said holders to guide them in moving from a vertical position within said compartment to an operative position at the top of said door.

15. In a device of the class described, a cabinet having a compartment to contain holders, a door pivoted adjacent the lower portion of said cabinet to permit the upper end of the door to be swung forwardly in relation to the cabinet, a plurality of holders adapted to lie in vertical planes in said compartment and arranged in a plurality of rows, front to back of said cabinet, said several holders being movable into position across the top of said door, the front row of holders being adapted to swing towards said open door to provide space for the swinging of the holders of the rear row.

16. In a device of the class described, a cabinet having a compartment to contain holders, a door pivoted adjacent the lower portion of said cabinet to permit the upper end of the door to be swung forwardly in relation to the cabinet, a plurality of holders adapted to lie in vertical planes in said compartment and arranged in a plurality of rows, front to back of said cabinet, the holders of both rows being movable into position across the top of said door, swinging members pivoted to said door for guiding the holders of said front row, the holders of said front row being adapted to swing towards the open door to provide space for the swinging of the holders of the rear row, the holders of the rear row being adapted to swing across the tops of the holders of the front row when moving into and out of operative position.

17. In a device of the class described, a cabinet having a compartment to contain holders, a door pivoted adjacent the lower portion of said cabinet to permit the upper end of the door to be swung forwardly in relation to the cabinet, a plurality of holders adapted to lie in vertical planes in said compartment and arranged in a plurality of rows, front to back of said cabinet, all of said holders being movable into operative position across the top of said door, upright pivotal posts for the holders of the rear row of holders, and means connecting the rear holders to said pivotal posts for guiding said rear holders while being moved into and out of operative position.

18. In a device of the class described, a cabinet having a compartment to contain holders, a door pivoted adjacent the lower portion of said cabinet to permit the upper end of the door to be swung forwardly in relation to the cabinet, a plurality of holders adapted to lie in vertical planes in said compartment and arranged in a plurality of rows, front to back of said cabinet, all of said holders being movable into position across the top of said door, pivotal means connected with said door and the front row of holders for guiding the latter while being moved into and out of operative position, posts pivoted in said compartment and lying in front of the holders of the rear row, pivotal means connected with said posts and with the rear holders to guide the latter when being moved into and out of operative position, the holders of the front row being adapted to swing toward the open door and said posts being adapted to swing toward said front holders to allow the rear holders to be moved into and out of operative position.

19. In a device of the class described, a cabinet having a compartment to contain holders, a door pivoted adjacent the lower portion of said cabinet to permit the upper end of the door to be swung forwardly in relation to the cabinet, a plurality of holders adapted to lie in vertical planes in said compartment and arranged in a plurality of rows, front to back of said cabinet, the holders of said front row being movable into position across the top of said door, the holders of the rear row being also movable into operative position across the top of said door and over the holders of the front row, and means for guiding the several holders when moved into and out of operative position.

20. In a device of the class described, a cabinet having a compartment to contain holders, a door pivoted adjacent the lower portion of said cabinet to permit the upper end of the door to be swung forwardly in relation to the cabinet, said holders being adapted to lie in vertical planes within said cabinet and to be swung into operative position across the top of said door, pivotal means for guiding the upper ends of said holders while being moved into and out of operative position and roller means for guiding the lower ends of said holders while being moved into and out of operative position.

21. In a device of the class described, a cabinet having a compartment to contain holders, a door pivoted adjacent the lower portion of said cabinet to permit the upper end of the door to be swung forwardly in relation to the cabinet, said holders being adapted to lie in vertical planes within said cabinet and to be swung into operative position across the top of said door, pivotal means for guiding the upper ends of said holders while being moved into and out of operative position, and roller means for guiding the lower ends of said holders while the holders are being moved into and out of operative position, said holders being adapted to rock in relation to said pivotal means, and rear stops for said holders to limit their swinging movement.

22. In a device of the class described, a cabinet having a compartment to contain holders, a door pivoted adjacent the lower portion of said cabinet to permit the upper end of the door to be swung forwardly in relation to the cabinet, a plurality of holders adapted to lie in vertical planes in said compartment and to be swung into operative position across the top of said door, a top cover for said compartment, and means operated automatically by said door for opening said top cover.

23. In a device of the class described, a cabinet having a compartment to contain holders, a door pivoted adjacent the lower portion of said cabinet to permit the upper end of the door to be swung forwardly in relation to the cabinet, a plurality of holders adapted to lie in vertical planes in said compartment and to be swung into operative position across the top of said door, a top cover composed of hinged sections for said compartment, and means operated automatically by said door for opening said top cover.

24. In a device of the class described, a cabinet comprising a lower compartment, an upper compartment lying above said lower compartment and spaced vertically therefrom, holders lying in vertical planes in said lower compartment and movable into position across the upper portion of said lower compartment, holders lying in vertical planes in said upper compartment and movable forwardly and downwardly into operative position in front of said upper compartment, and a top cover for said lower compartment composed of foldable sections adapted to be folded and to be swung upwardly and downwardly between said compartments to open said lower compartment.

25. In a device of the class described, a cabinet having a lower compartment and an upper compartment disposed above the lower compartment, a plurality of holders in said lower compartment and means for guiding said holders to move into a position across the top of the lower compartment, a plurality of holders in said upper compartment, and means for guiding them to move downwardly and forwardly into operative position, and common means for locking the holders of both upper and lower compartments within said cabinet.

ZEMACH AUERBACH.